71-6 SR
2/4/86 OR H 000,025

United States Statutory Invention Registration [19]

[11] Reg. Number: H25

Radel [45] Published: Feb. 4, 1986

[54] THIOPHOSPHORYL TRIAMIDE AS A UREASE INHIBITOR

[75] Inventor: Robert J. Radel, Florence, Ala.

[73] Assignee: Tennessee Valley Authority, Muscle Shoals, Ala.

[21] Appl. No.: 745,051

[22] Filed: Jun. 17, 1985

[51] Int. Cl.[4] ..... C05F 11/08
[52] U.S. Cl. ..... 71/6; 71/7; 71/28; 71/902

*Primary Examiner*—Edward A. Miller
*Attorney, Agent or Firm*—Robert A. Petrusek

[57] ABSTRACT

My testing procedures have demonstrated that thiophosphoryl triamide (I) and its linear thermal polymers (II) having the structures illustrated below are highly effective inhibitors of urease activity in agricultural soil systems.

I

II

5 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THIOPHOSPHORYL TRIAMIDE AS A UREASE INHIBITOR

The invention herein described may be manufactured and used by or for the Government for governmental purposes without the payment to me of any royalty therefor.

The enzyme urease (urea amidohydrolase, EC 3.5.1.5) is a ubiquitous component of many soil systems and has been isolated from a number of microbes and many different plants. In soil systems, urease activities serve to catalyze the hydrolysis of urea to produce ammonia and carbon dioxide according to the following reaction:

$$NH_2CONH_2 + H_2O \xrightarrow{\text{urease}} 2NH_3 + CO_2$$

The ammonia produced is subsequently hydrolyzed to nutrient ammonium salts.

$$NH_3 + H_2O \rightleftharpoons NH_4^+ + OH^-$$

The $NH_4^+$ then is transformed to $NO_3^-$ by aerobic nitrifying bacteria in the soil.

$$NH_4^+ + 2O_2 \rightarrow NO_3^- + H_2O + 2H^+$$

This sequence of reactions supra serves a vital function in providing inorganic nitrogen for growing plants. However, urease-induced hydrolysis of urea can cause a considerable loss of volatile ammonia, especially when urea fertilizers are surface applied to agricultural soils [Darrell W. Nelson, "Nitrogen in Agricultural Soils," *Am. Soc. Agron.*, Madison, WI, pp 327–358 (1982)]. Most of ammonia volatilization from urea occurs in the first week after application. Moderate delays in urea hydrolysis during this time period can greatly reduce ammonia volatilization losses for several reasons. For instance, the farmer has more time to incorporate urea beneath the soil surface before such ammonia losses occur. There is a greater probability of receiving rain with resulting incipient percolation of fertilizer nitrogen values into the soil before such ammonia losses occur. Also, a larger fraction of the applied nitrogen is converted to $NO_3^-$ before being lost as ammonia.

Urea and urea-containing fertilizers presently account for about 30% of the fertilizer nitrogen applied in the United States [J. Darwin Bridges, *Fertilizer Trends* 1982, TVA (1983)], and urea accounts for as much as 60% of the fertilizer nitrogen applied worldwide (unpublished TVA data). The economics-based prediction for these percentages shows an increase because urea has a high nitrogen content, low transportation cost, and low production cost relative to alternative nitrogen sources, such as ammonium nitrate and ammonium sulfate. Inasmuch as the relative importance of urea as a primary nitrogen fertilizer is expected to increase to even greater proportions than it now enjoys and substantial amounts of such urea and/or urea-containing fertilizers are applied in situations such as reduced tillage, pastures, and nonmechanized agriculture where it is impractical to mechanically incorporate urea to prevent ammonia volatilization, the development of suitable urease inhibitors is an endeavor of considerable importance for both domestic and international agricultural considerations.

Considerable effort is being devoted by a number of research groups in both the private and public sector to develop suitable urease inhibitors. A particularly promising class of urease inhibitors is compounds containing phosphoroamide groups, $R_xPO(NH_2)_{3-x}$, where $R = NH_2$, OH, phenol, etc. Several researchers in the art have demonstrated that phenyl phosphorodiamidate, $(C_6H_5O)PO(NH_2)_2$, is an extremely potent inhibitor of urease activity [P. Held, S. Lang, E. Tradler, M. Klepel, D. Drohne, H. J. Hartbrich, G. Rothe, H. Scheler, S. Grundmeier, and A. Trautmann, East German Pat. No. 122,177 (Cl. C05G3/08, September 20, 1976), *Chem. Abstracts* 87:67315W; D. A. Martins and J. M. Bremner, *Soil Sci. Soc. Am. J.* 48, 302–305 (1984)]. Recently, Bayless and Millner (U.S. Pat. No. 4,242,325, 1980 and U.S. Pat. No. 4,182,881, 1980) showed that phosphoryltriamide, $PO(NH_2)_3$, and a series of N-(diaminophosphinyl) arylcarboxamides also are powerful urease inhibitors. Other investigators have shown that diamidophosphoric acid, $PO(NH_2)_2OH$, and monoamidophosphoric acid, $PO(NH_2)(OH)_2$, also are effective urease inhibitors [A. Barth, W. Rollka, and H. J. Michel, *Wissenschaftliche Beitraege-Martin Luther Universitaet Halle Wittenberg*, No. 2, pp. 5–10 (1980); N. E. Dixon, C. Gazzola, J. J. Waters, R. L. Blakeley, and B. Zerner, *J. Am. Chem. Soc.* 97, 4131 (1975)].

BACKGROUND OF THE INVENTION

1. Field of the Invention

In arriving at the gist underlying the concept of the instant invention, it was conceived that thiophosphoryl triamide and its linear polymers, though not members of the phosphoramide class of compounds discussed above and shown by previous workers (TVA unpublished data; German Pat. No. 142,714, July 9, 1980; German Offensive No. 2,504,193, Sept. 4, 1975) to be ineffective as a urease inhibitor, should be reinvestigated as urease activity inhibitors. I unexpectedly found that thiophosphoryl triamide and its linear polymers are excellent urease inhibitors; in fact, the thiophosphoryl triamide can be shown to be superior to phenylphosphoryl triamide, the most potent urease inhibitor known to date.

2. Description of the Prior Art

Some phosphorus, oxygen, and nitrogen-containing heterocyclic compounds of the general structure $R_xPO(NH_2)_{3-x}$, where $R = NH_2$, $OHOC_6H_5$, etc., and similar in structure to the thiophosphoryl amides, have been reported to be extremely effective urease inhibitors. Several researchers in the art have demonstrated that phenyl phosphorodiamidate, $(C_6H_5O)PO(NH_2)_2$, is an extremely potent inhibitor of urease activity [P. Held, S. Lang, E. Tradler, M. Klepel, D. Drohne, H. J. Hartbrich, G. Rothe, H. Scheler, S. Grundmeier, and A. Trautmann, East German Pat. No. 122,177 (Cl. C05G3/08, Sept. 20, 1976), *Chem. Abstracts* 87:67315W; D. A. Martins and J. M. Bremner, *Soil Sci. Soc. Am. J.* 48, 302–305 (1984)]. As was mentioned earlier, Bayless and Millner (U.S. Pat. No. 4,242,325, 1980, and U.S. Pat. No. 4,182,881, 1980) showed that phosphoryl triamide, $PO(NH_2)_3$, and a series of N-(diaminophosphinyl) arylcarboxamides also are powerful urease inhibitors. Other investigators have shown that diamidophosphoric acid, $PO(NH_2)_2OH$, and monoamidophosphoric acid, $PO(NH_2)(OH)_2$, also are effective urease inhibitors [A. Barth, W. Rollka, and H. J. Michel, *Wissenschaftliche Beitraege-Martin Luther Universitaet Halle Wittenberg*, No. 2, pp 5–10 (1980); N. E. Dixon, C. Gazzola, J. J. Waters, R. L. Blakeley, and B. Zerner, *J. Am. Chem. Soc.* 97, 4131 (1975)].

Also, since the prior art teaches that phenylphosphoryl triamide and phosphoryl triamide are both effective urease inhibitors, one expects that thiophosphoryl triamide would similarly be less effective as an inhibitor since phenylthiophosphenyl diamidate is less effective as an inhibitor.

It may be possible that the two inhibitor classes have substantially the same mechanism of inhibition, to wit, reacting with the essential sulfhydryl group(s) on the active site(s) of the urease. At this time, however, I can only speculate that the inhibitory properties of the thiophosphoryl triamide and its linear polymers result either from some yet unidentified chemical properties and/or characteristics of the compounds themselves. If the mechanism is related to reacting with, or inhibiting of such sulfhydryl group(s), it might be classified as irreversible inhibition, but more probably as competitive inhibition.

Several hundred scientific papers have been published on urease since Sumner (1926) first produced the classical octahedral crystals and showed that the enzyme was a protein, but it was in 1969 that Zerner's group [R. L. Blakeley, E. C. Webb, and B. Zerner, *Biochemistry* 8, 1984–1990 (1969)] prepared a highly purified urease with a full specific activity and in at least a 99% homogeneous state. They established with this preparation a reproducible molecular weight (about 590,000) and proposed that the molecule contained six subunits with asparagine as the N-terminal amino acid. Although previous work [J. F. Ambrose, G. B. Kistiakowsky, and A. G. Kridl, *J. Am. Chem. Soc.* 73, 1232 (1951)] had indicated that four or eight essential SH-groups were involved in the urea-hydrolysis reaction, Zerner's group could only confirm that the active site SH-groups "react slowly with N-ethylmaleimide," but they were unable to define unequivocally the number of "essential SH groups" in the 590,000 molecular weight species. In addition, Kobashi et al. [K. Kobashi, J. Hase, and T. Komai, *Biochem. Biophys. Res. Commun.* 23, 34 (1966)], on the basis of inhibition by hydroxamic acids, suggested that the number of active sites in the 590,000 molecular weight species of sword bean urease was two. These results seem to be confirmed by the discovery that highly purified urease from jack bean [N. E. Dixon, C. Gazzola, R. L. Blakeley, and B. Zerner, *J. Am. Chem. Soc.* 97 4131 (1975)] and from tobacco, rice, and soybean [J. C. Polacco, *Plant Science Letters* 10 249–255 (1977)] contained stoichiometric amounts of nickel (two atoms per active site), demonstrating simultaneously the first biological role definitely assigned to nickel. Over the last few years considerable effort has been made to elucidate the mechanism of the urease reaction. Although attempts to demonstrate the formation of a carbamoyl-enzyme intermediate, which was postulated many years ago, have so far failed, Zerner's group [N. E. Dixon, P. W. Riddles, C. Gazzola, R. L. Blakeley, and B. Zerner, *Can. J. Biochem.* 58, 1335–1344 (1980)] proposed a mechanism of reaction on the basis of a carbamoyl-transfer reaction and where the substrate is activated toward nucleophilic attack by O-coordination to a $Ni^{2+}$ ion. Both $Ni^{2+}$ ions are involved in this proposed mechanism. A second mechanism of reaction based on the determination of kinetic isotope effects [R. Medina, T. Olleros, and H. L. Schmidt, *Proc. 4th Int. Conference on Stable Isotopes, H. L. Schmidt, H. Forstel, and K. Heizinger, eds., Julich, March* 1981, Elsevier, Amsterdam (1982), pp 77–82] was proposed. These results indicated the existence of an enzyme-bound carbamate intermediate and demonstrated that the enzyme-Ni-substrate complex decomposes, releasing the first $NH_3$ in a slow, rate-limiting step.

An additional complication develops from the tendency of the urease to form polymers and isozymes changing the properties of the original monomeric enzyme and probably the mechanism of reaction [W. N. Fishbein and K. Nagarajan, *Arch. Biochem. Biophys.* 144, 700–714 (1971)]. Finally, the properties of soil urease differ significantly from those of ureases from other sources [J. M. Bremner and R. L. Mulvaney, *Soil Enzymes,* R. G. Burns, ed., Academic Press (1978), pp 149–196)]; and it is much more difficult to obtain reliable kinetic data for enzymes in heterogeneous environments, such as soil, than for enzymes in homogeneous solutions.

While many urease inhibitors have been identified, few kinetic descriptions include the type of inhibition. The reversible and competitive inhibition of sword bean urease by a wide variety of hydroxamic acids was discovered by Kobashi et al. [K. Kobashi, J. Hase, and K. Uehara, *Biochim. Biophys. Acta* 65, 380–383 (1962)]. Kinetic and spectral studies performed by B. Zerner and coworkers [N. E. Dixon, J. A. Hinds, A. K. Fihelly, C. Gazzola, D. J. Winzor, R. L. Blakeley, and B. Zerner, *Can J. Biochem.* 58, 1323–1334 (1980)] established that hydroxamic acids were reversibly bound to active-site nickel ions in jack bean urease. Chemical and physical studies of the enzymatically inactive phosphoramidate-urease complex provide convincing evidence that phosphoramidate binds reversibly to the active-site nickel ion [N. E. Dixon, R. L. Blakeley, and B. Zerner, *Can. J. Biochem.* 58, 481–488 (1980)].

The kinetics of urease inhibition by phenyl phosphorodiamidate (which demonstrates a competitive inhibition) and hydroquinone (which exemplifies a mixed inhibition mechanism) were performed by L. J. Youngdahl and E. R. Austin at the International Fertilizer Development Center (IFDC, unpublished results). A kinetic study of the soil urease inhibition by six substituted ureas, compounds which are used as herbicides, showed that all six compounds exhibited mixed inhibition characteristics (competitive and noncompetitive) [S. Cervelli, P. Nannipieri, G. Giovannini, and A. Perna, *Pesticide Biochem. Physiol.* 5, 221–225 (1975)].

There are very few additional publications on kinetic studies concerning soil ureases [J. M. Bremner and R. L. Mulvaney, *Soil Enzymes,* R. G. Burns, ed., Academic Press (1978), pp 149–196]. The main work in this area has been to establish the inhibitory properties of potential test compounds, irrespective of the kind of inhibition that is responsible for the retardation of the urea hydrolysis. However, the successful use of this technology by the fertilizer industry does not require that the mechanism be indentified.

Taking into consideration all of this information, one can establish that even though urease has been extensively studied for about 60 years, the mechanism of action and the mechanism of inhibition of this enzyme, especially in heterogeneous environments such as soils, are at best only partially known.

SUMMARY OF THE INVENTION

The present invention relates to a class of materials previously shown to be less effective than the substituted phosphoryl diamidates as urease inhibitors in the soil (unpublished TVA data) and in mamalian systems (German Pat. No. 142,714, July 9, 1980; German Offensive No. 2,504,193, Sept. 4, 1975; German Pat. No. 122,621, 1975). I have now shown that this class of materials can be effectively used as potent urease activity inhibitors in agricultural soil systems including the parent thiophosphoryl triamide (I) and linear polymers (II) thereof.

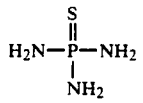

I

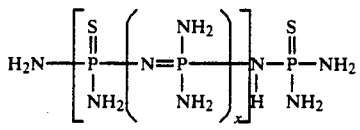

II

OBJECTS OF THE INVENTION

The principal object of the present invention is to identify and characterize a highly effective inhibitor which will, when admixed with urea or urea-containing fertilizers, prevent or greatly reduce the loss of ammoniacal nitrogen from agricultural soils resulting from the urease-induced hydrolysis of urea. The highly effective inhibitors that I have discovered and which are herein identified and characterized are thiophosphoryl triamide (I) and linear polymer derivatives thereof (II).

It is a further object of the present invention to show that although previous work has indicated this class of compounds to be ineffective as urease inhibitors, they can actually be, if properly utilized, more effective or at least as effective as the most effective inhibitors known up to this time, i.e., phenyl phosphorodiamidate.

DESCRIPTION OF THE DRAWINGS

The present invention, together with the further objects and advantages thereof, will be better understood from a consideration of the following description taken in connection with the accompanying drawings in which.

Figure 1:
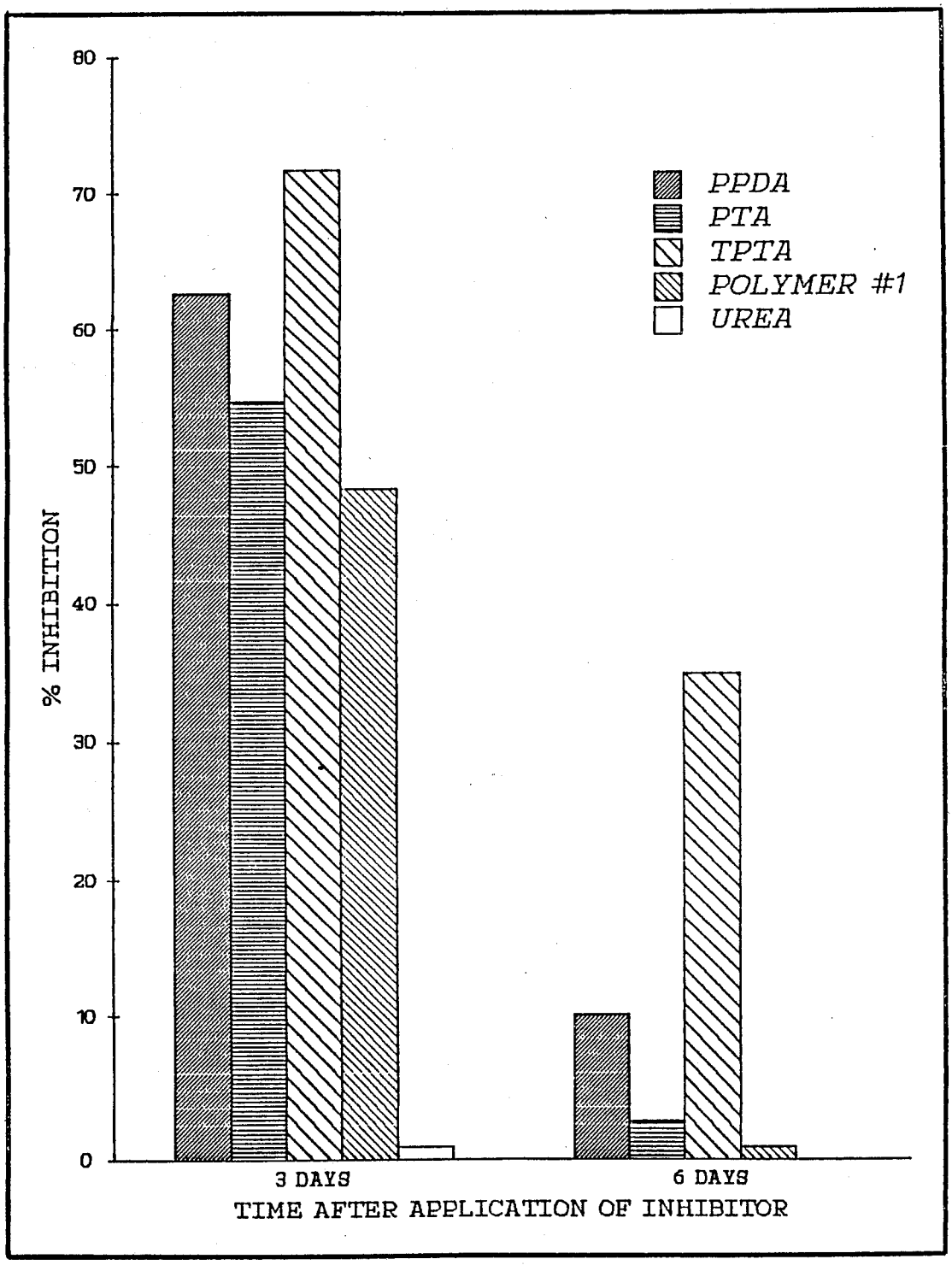
FIG. 1 is a graphical representation of urease inhibition as a funtion of time for Test Series I in a banded soil system.

For the sake of convenience and greater appreciation of the results of my discoveries leading to the present invention, more specific references to FIGS. 1–4 are combined with the appropriate discussion of pertinent data and presented therewith infra.

DESCRIPTION OF PREFERRED EMBODIMENTS

For ease and convenience of application, the thiophosphoryl triamide or its thermal polymers may be incorporated into urea or urea-containing fertilizers by mixing, prilling, granulating, coating, or other means familiar to those knowledgeable in the art of producing and/or blending fertilizer materials, some of which are illustrated in the following teachings of the testing methods I utilized in my work leading to the discoveries comprising the present invention. Additional pertinent information relating to the preferred embodiment is also found in my discussions of the examples combined with FIGS. 1–4 infra.

TESTING METHODS

Urease activity inhibitor test compounds may be evaluated either in aqueous or in soil systems. When aqueous systems are used, urea plus a test compound with possible urease inhibition activity and relatively pure urease enzyme are incubated together to determine the effects of the test compound on urease-catalyzed hydrolysis of urea. When soil systems are used, urea and the test compound are added to moist soil, and the urease enzyme is supplied from the soil. The main disadvantage of using soil systems is that the true activity of test compounds may be masked because of reactions between the test compound and soil. Thus, basic studies for understanding chemical structure-activity relationships are usually done in aqueous systems. However, soil systems must be used to determine the principal applicability of test compounds since soil can significantly modify inhibitory effects of these compounds.

The most common and conventional method for evaluating potential urease inhibitors in soil systems is to mix both urea and the test compound throughout the soil and determine the effects of the test compound on the rate of urea hydrolysis [L. A. Douglass and J. M. Bremner, *Soil Biol. Biochem.* 3, 309–315 (1971); J. M. Bremner and R. L. Mulvaney, "Urease Activity in Soils," Chapter 5 in *Soil Enzymes,* R. G. Burns, ed., Academic Press (1978), pp 149–195)].

Test compounds in Example I, infra, were evaluated in soil systems by my devised alternative procedure in which powdered mixtures of urea and test compounds were applied in narrow bands in the soil rather than being mixed throughout the soil. The banded configuration is not only applicable to banded applications, but also results in concentration gradients of urea, urea hydrolysis products, test compounds, and test compound decomposition products similar to those in the immediate vicinity of urea granules containing test compounds. Another advantage of the banded configuration compared with mixing throughout the soil is that slightly soluble test compounds can be easily band applied, whereas it is difficult to achieve a known degree of mixing of a small quantity of slightly soluble test compound with soil. The banded configuration also enables testing for urease inhibition under realistic soil conditions prior to the development of techniques for cogranulating a wide range of test compounds with urea.

Specifics of the procedure for evaluating test compounds in Example I were the following. Urease-active soil (Hastings silt loam) was moistened to a moisture content of 20% (dry weight basis) and preincubated at room temperature for two days. Plexiglas containers (6×6×6 -cm) were one-half filled with soil and packed to a bulk density of 1.1 g/cm$^3$. Urea or urea plus inhibitor (thoroughly mixed) was distributed in a narrow band 6-cm long on the soil surface. The containers then were filled with soil, again packing to a bulk density of 1.1 g/cm$^3$. The containers were incubated at 25° C. for the desired reaction period, after which the containers were frozen to about −5° C. to stop urea hydrolysis. Immediately prior to extracting the remaining urea from the soil, said soil was allowed to thaw. Soil from each container was thoroughly mixed, and a 10-g sample was extracted with 100 ml of 2 M KCl containing phenylmercuric acetate to prevent urea hydrolysis during handling [L. A. Douglass and J. M. Bremner, *Soil Sci. Soc. Am. Proc.* 34, 859–862 (1970)]. Urea in the extracts was determined with an automated version of the colorimetric procedure [L. A. Douglass and J. M. Bremner, *Anal. Letters* 3 (2), 79–87 (1970)].

Test compounds in Example II, infra, were evaluated in soil systems by a modification of the Douglass and Bremner procedure [L. A. Douglass and J. W. Bremner, *Soil Biol. Biochem.* 3, 309–315 (1971)] in which solutions or suspensions of the test compounds were mixed throughout the soil. Then at selected time intervals urea was added to the soil-inhibitor mixtures. The advantage of this procedure is that soil urease inhibition by the test compounds can be detected for time periods lasting up to several weeks or longer. Rapid urea hydrolysis in other test procedures may limit their applicability to test compounds that have slow and sustained inhibition properties. As was previously demonstrated in FIG. 2 and at least in part by the data in Table III of Example I, infra, the test compounds show slow and sustained inhibitory properties.

Specifics of the procedure for evaluating the test compounds in Example II were the following. Urease-active soil (Crowley silt loam from Louisiana) was moistened to a moisture content of 16% (dry weight basis) and preincubated at room temperature for two days. One milliliter of solution or suspension containing 7 micromoles of each test compound was added to 120 g of moist soil and mixed well. Polyvinylchloride cylinders 12-cm long and 4 cm in diameter were filled with the inhibitor-soil mixtures, packed to a bulk density of about 0.9 g/cm$^3$, and covered with a perforated plastic film. These columns of inhibitor-soil mixtures plus untreated check columns were incubated at 30° C. for periods of 0, 3, 7, 14, and 21 days at constant moisture content. At each time interval, 1 ml of urea solution containing 50 mg of urea was mixed well with the inhibitor-soil mixture from a single column. The urea-inhibitor-soil mixture was packed in a column to a bulk density of about 0.9 g/cm$^3$, covered with a perforated plastic film, and reincubated for 16 hours at 30° C. Following the 16 hours of reincubation, about 120 g of the urea-inhibitor-soil mixture was extracted with 250 ml of 2 M KCl containing 5 ppm of phenyl phosphorodiamidate. The KCl-PPDA extracts were analyzed on the Auto Analyzer II [Technicon method No. 40001 FD4, Technicon, Tarrytown, N.Y., U.S.A. (1974)]. Three replicates were used on all treatments and checks.

EXAMPLES

In order that those skilled in the art may better understand the preferred embodiment of the present invention and by way of illustration and not necessarily by way of limitation, the following examples are given. Names of compounds used in the examples together with the respective abbreviations therefor and their chemical formulas are shown in Table I below.

TABLE I

Compounds and Chemical Formulas

| Name | Formula |
|---|---|
| Phenyl phosphorodiamidate (PPDA) | $(C_6H_5O)PO(NH_2)_2$ |
| Phosphoryl triamide (PTA) | $PO(NH_2)_3$ |
| Thiophosphoryl triamide (TPTA) | $PS(NH_2)_3$ |
| Polythiophosphoryl triamide (PTPTA) | $H_2N[PSNH_2(NP(NH_2)_2)_x]_yNHPS(NH_2)_2$ |

Thiophosphoryl triamide and phosphoryl triamide were prepared by the method of Klement and Koch [R. Klement and O. Koch, *Chem. Ber.* 87, 333–340 (1954)]. Polymeric thiophosphoryl amide was prepared by bubbling ammonia through a solution of phosphorous pentasulfide in hexamethyl phosphoryl triamide at 140° C. for 8 hours.

Polymers 1A-4B were prepared by heating several weighted samples of $PS(NH_2)_3$ under vacuum at 150° C. until a specified volume of ammonia was liberated (see Table II below). Phenyl phosphorodiamidate was obtained commercially and used without further purification.

TABLE II

Reaction Conditions for Thermal Polymerization of $PS(NH_2)_3$

| Polymer number | Sample weight, gm | Weight loss, gm | Total $NH_3$ loss, ml |
|---|---|---|---|
| Polymer 1A | 0.709 | 0.078 | 255 |
| Polymer 1B | 0.723 | 0.065 | 288 |
| Polymer 2A | 0.774 | 0.087 | 278 |
| Polymer 2B | 0.774 | 0.060 | 287 |
| Polymer 3A | 0.870 | 0.079 | 393 |
| Polymer 3B | 0.872 | 0.067 | 343 |
| Polymer 4A | 1.157 | 0.087 | 554 |
| Polymer 4B | 1.157 | 0.060 | 343 |

EXAMPLE I

The material in Table I was prepared by the methods described above. Phosphoryl triamide and phenyl phosphorodiamidate were used as reference, supra. Its relative effectiveness versus several other known urease inhibitors was tested by the following procedure.

Figure 2:
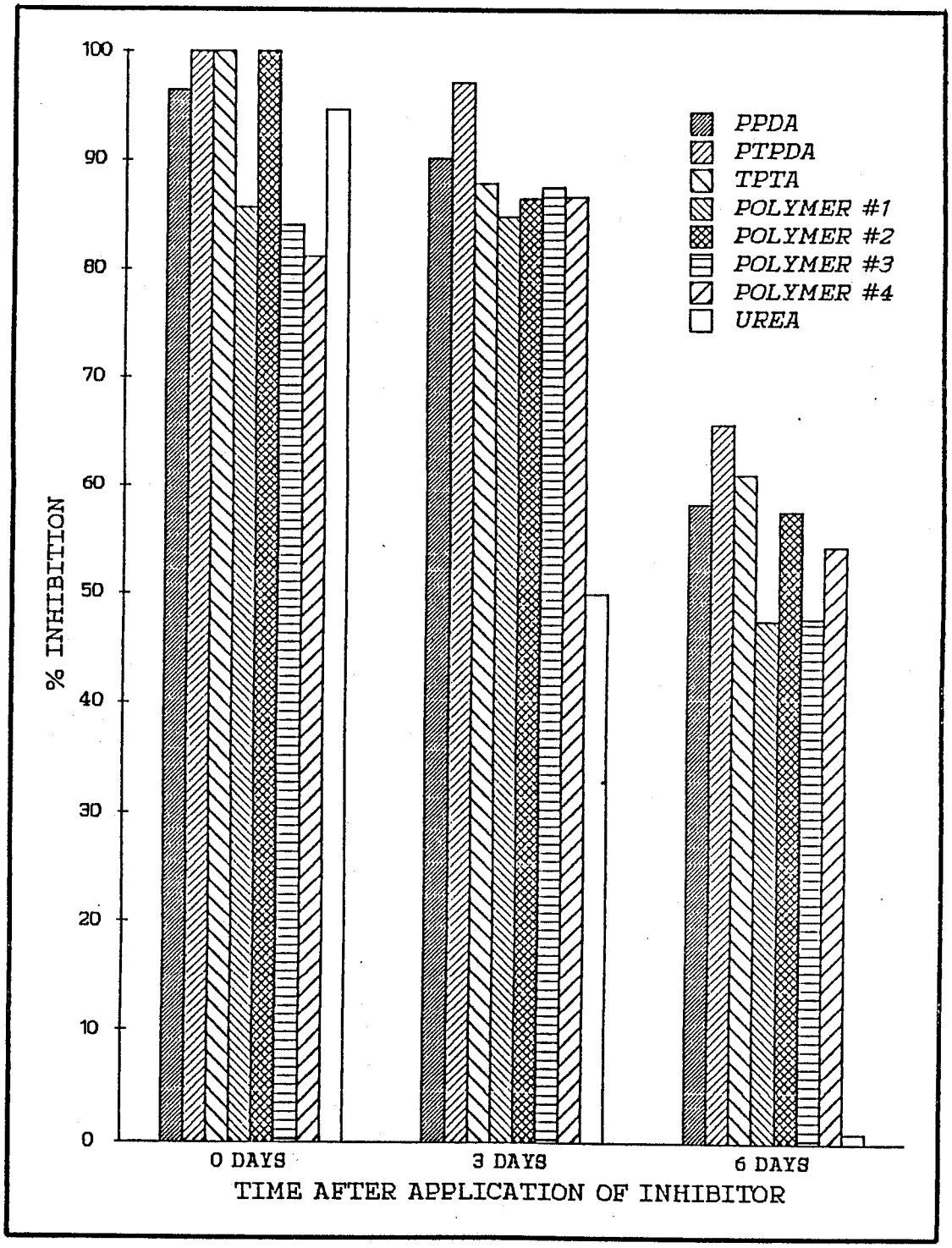
FIG. 2 is a graphical representation of urease inhibition as a function of time for Test Series II in a banded soil system.
Figure 3:
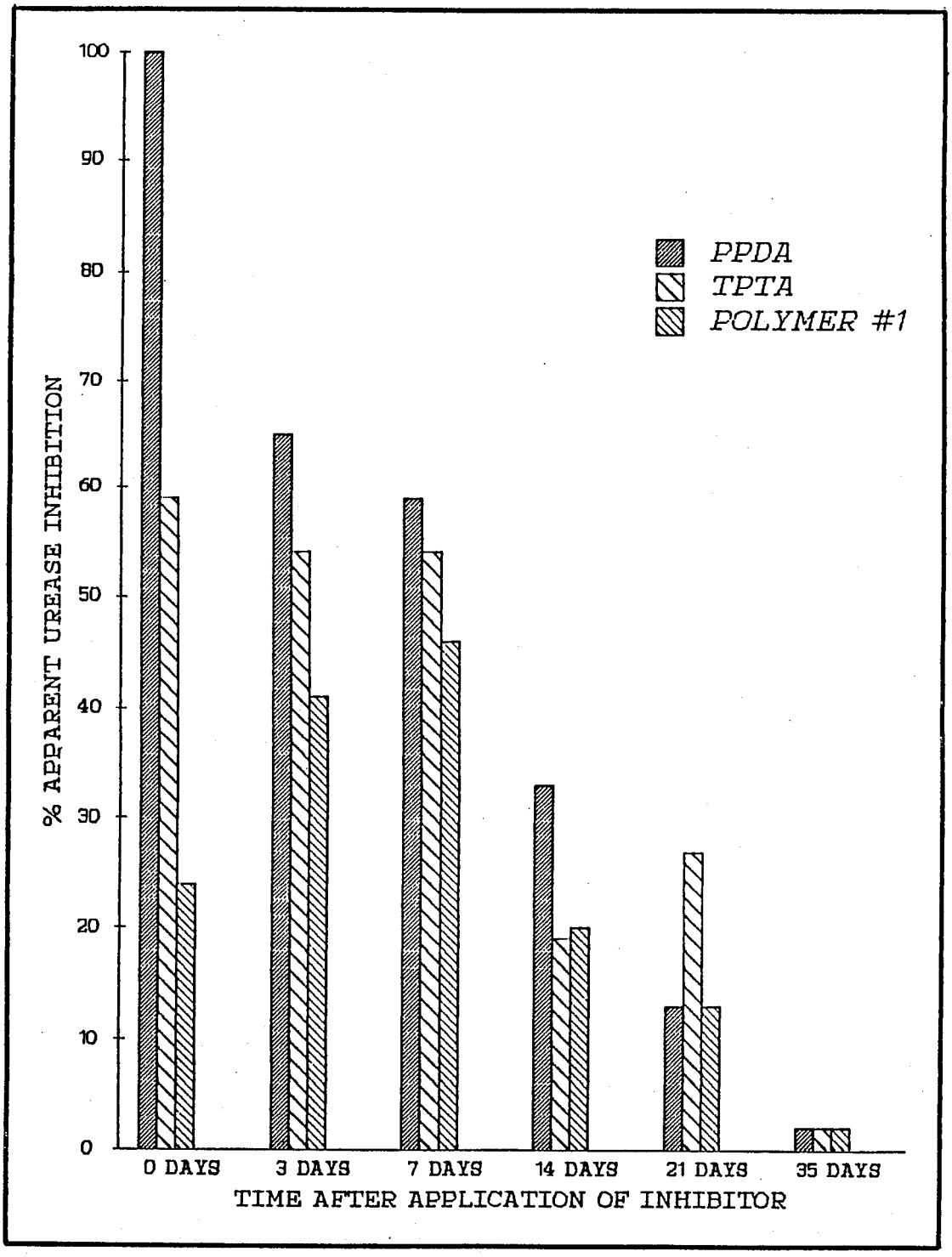
FIG. 3 illustrates the change in urease inhibition with time using a modification of my devised evaluation and testing procedure, which allows measurement of urease inhibition as a function of inhibitor incubation time for Test Series I.
Figure 4:
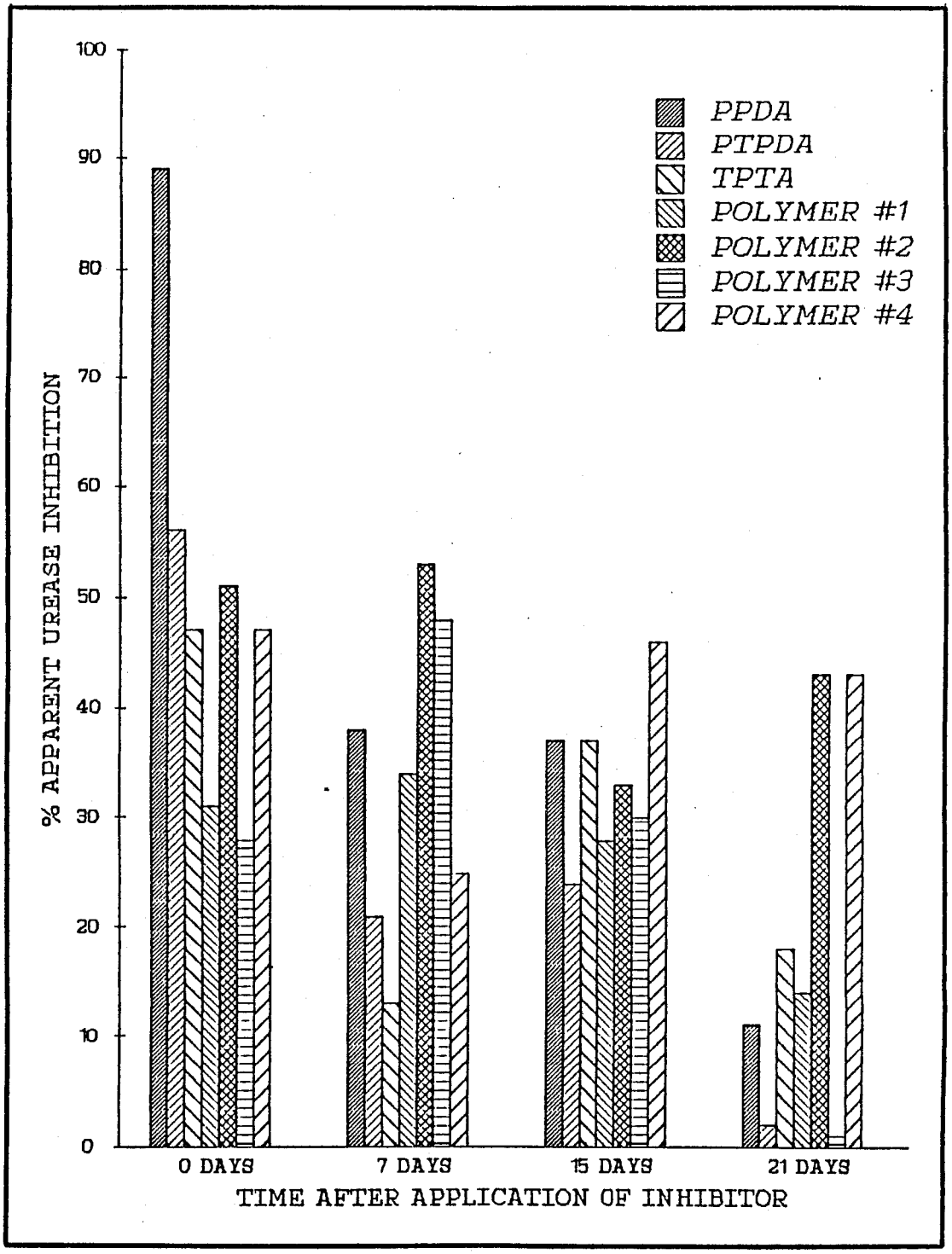
FIG. 4 illustrates the change in urease inhibition with time using a modification of my evaluation and testing procedure, which allows measurement of urease inhibition as a function of inhibitor incubation time for Test Series II.

Urease-active soil (Hastings silt loam) was moistened to a moisture content of 20% and preincubated at room temperature for two days. Plexiglas containers (6×6×6 cm) were one-half filled with soil and packed to a bulk density of 1.1 g/cm$^3$. Urea or urea plus inhibitor (thoroughly mixed) was distributed in a narrow band 6-cm long on the surface of the soil. The containers then were filled with soil and again packed to a bulk density of 1.1 g/cm$^3$. The containers were incubated at 25° C. for the desired reaction period. The soil from each container was thoroughly mixed, and a 10-g sample was extracted with 100 ml of 2 M KCl containing 5 ppm phenylmercuric acetate to prevent urea hydrolysis during handling [L. A. Douglass and J. M. Bremner, *Soil Sci. Soc. Am. Proc.* 34, 859–862 (1970)]. The urea in the extracts was determined colorimetrically as a measure of the unhydrolyzed urea. The results of three-day and six-day tests for equimolar inhibitor contents are given in Table III below for two series of tests (Test Series I and Test Series II). These results, as well as FIGS. 1 and 2, show that thiophosphoryl is superior to PPDA as an inhibitor of soil urease activity and the polythiophoshoryl amides are nearly as good as PPDA. In three-day tests, its performance exceeds that of all other inhibitors tested. Its longer term effectiveness (six days) also is greater than that of PPDA.

TABLE III

Urea Hydrolysis in Bands of Urea as Affected by Urease Inhibitor Test Compounds Applied at a Rate of 10% Urea (wt/wt Basis)[a]

| N source | Wt mg/band | Inhibitor | Wt mg/band | % inhibition[b] 0 days | 3 days | 6 days |
|---|---|---|---|---|---|---|
| | | TEST SERIES I | | | | |
| Urea | 410[c] | $C_6H_5OPO(NH_2)_2$ (PPDA) | 41 | — | 62.6 | 10.1 |
| Urea | 410[c] | $P{=}O(NH_2)_3$ (PTA) | 41 | — | 54.6 | 2.6 |
| Urea | 410[c] | $P{=}S(NH_2)_3$ (TPTA) | 41 | — | 71.7 | 34.9 |
| Urea | 410[c] | ($P_2S_5$ + $NH_3$) polymer | 41 | — | 48.4 | 0.9 |
| Urea | 410[c] | None | — | — | 0.9 | 0 |
| | | TEST SERIES II | | | | |
| Urea | 410 | $C_6H_5OPO(NH_2)_2$ (PPDA) | 41 | 96.4 | 90.3 | 58.2 |
| Urea | 410 | $C_6H_5OPS(NH_2)_2$ (PTPDA) | 41 | 100.0 | 97.2 | 65.7 |
| Urea | 410 | $PS(NH_2)_3$ (TPTA) | 41 | 100.0 | 88.0 | 61.1 |
| Urea | 410 | Polymer 1 | 41 | 85.7 | 84.9 | 47.4 |
| Urea | 410 | Polymer 2 | 41 | 100.0 | 86.6 | 57.5 |
| Urea | 410 | Polymer 3 | 41 | 84.1 | 87.6 | 47.6 |
| Urea | 410 | Polymer 4 | 41 | 81.3 | 86.7 | 54.2 |
| Urea | 410 | | — | 94.6 | 50.0 | 0.94 |

[a]Two replicates with Hastings silt loam soil.
[b]As measured by percent urea unhydrolyzed.
[c]Urea N rate equivalent to 100 kg/ha applied in bands 30-cm apart, 6-cm long.

EXAMPLE II

Thiophosphoryl triamide and polythiophosphoryl triamide were prepared as above and PPDA was used as reference, supra. The soil urease inhibition was tested using Crowley silt loam and a well-mixed system modified from that of Douglass and Bremner [L. A. Douglas and J. M. Bremner, *Soil Biol. Biochem.* 3, 309–315 (1971)]. The results of the tests are given in Table IV below.

Specifics of the procedure for evaluating the test compounds in Example II are as follows. Urease-active soil (Crowley silt loam from Louisiana) was moistened to a moisture content of 16% (dry weight basis) and preincubated at room temperature for two days. One milliliter of solution or suspension containing 7 micromoles of each test compound was added to 120 g of moist soil and mixed well. Polyvinylchloride cylinders 12-cm long and 4 cm in diameter were filled with the inhibitor-soil mixtures, packed to a bulk density of about 0.9 g/cm$^3$, and covered with a perforated plastic film. These columns of inhibitor-soil mixtures plus untreated check columns were incubated at 30° C. for periods of 0, 3, 7, 14, and 21 days at constant moisture content. At each time interval, 1 ml of urea solution containing 50 mg of urea was mixed well with the inhibitor-soil mixture from a single column. The urea-inhibitor-soil mixture was packed in a column to a bulk density of about 0.9 g/cm$^3$, covered with a perforated plastic film, and reincubated for 16 hours at 30° C. Following the 16 hours of reincubation, about 120 g of the urea-inhibitor-soil mixture was extracted with 250 ml of 2 M KCl containing 5 ppm of phenyl phosphorodiamidate. The KCl-PPDA extracts were analyzed on the Auto Analyzer II [Technicon method No. 40001 FD4, Technicon, Tarrytown, New York, U.S.A. (1974)]. Three replicates were used on all treatments and checks. Two groups of compounds were tested as indicated in Table IV as Test Series I and Test Series II.

TABLE IV

Effect of Well-Mixed Inhibitor on Urease Activity in Unsaturated Crowley Soil (About 16% Moisture) at 30° C.

| Inhibitor | Apparent urease activity with incubation time, days[a] 0 | 3 | 7 | 14 | 21 | 35 |
|---|---|---|---|---|---|---|
| TEST SERIES I | | | | | | |
| $C_6H_5OPO(NH_2)_2$ (PPDA) | 100 | 65 | 59 | 33 | 13 | 2 |
| $PS(NH_2)_3$ (TPTA) | 59 | 54 | 54 | 19 | 27 | 2 |
| ($P_2S_5$ + $NH_3$) polymer I | 24 | 41 | 46 | 20 | 13 | 2 |
| TEST SERIES II | | | | | | |
| Inhibitor | 0 | 3 | 7 | 15 | 21 | 35 |
| $C_6H_5OPO(NH_2)_2$ (PPDA) | 89 | — | 38 | 37 | 11 | — |
| $C_6H_5OPS(NH_2)_2$ (PTPDA) | 56 | — | 21 | 24 | 2 | — |
| $PS(NH_2)_3$ (TPTA) | 47 | — | 13 | 37 | 18 | — |
| PS polymer 1 | 31 | — | 34 | 28 | 14 | — |
| PS polymer 2 | 51 | — | 53 | 33 | 43 | — |
| PS polymer 3 | 28 | — | 48 | 30 | 1 | — |
| PS polymer 4 | 47 | — | 25 | 46 | 43 | — |

[a]As measured by percent urea unhydrolyzed.

This modification of the inhibitor-soil-urea evaluation procedure permits the measurement of urease inhibition in a system that is independent of the time of urea addition. This contrasts with the conventional methods used to collect the data presented in FIGS. 1 and 2 and Table III supra. The data in Table III, in part, show that essentially all urea in the uninhibited soil tests was hydrolyzed by the soil urease in six days or less. In the modified procedure, supra, the unhydrolyzed urea in the uninhibited soil samples averaged 66–70% at the time of analysis for time periods up to 21 days, thus verifying the advantage of this procedure in comparison with the conventional methods.

In FIGS. 1 and 2 supra the conventional test shows that none of the test compounds are effective inhibitors beyond about 10 days. However, when the same compounds are tested in the time-independent modified soil evaluation procedure, the results in Table IV and FIGS. 3, and 4 supra show that significant activity remains with all three compounds tested even up to 21 days, with the thiophosphoryl triamide being superior at this long incubation time.

COMPARATIVE EXAMPLE III

Phenylthiophosphenyl diamidate was included in Test Series II for both banded soil tests and well-mixed meubation soil tests as a comparative example to show the contradictory nature of my results to those of previous works (German Pat. No. 142,714, July 9, 1980; German Offensive No. 2,504,193, Sept. 4, 1975; German Pat. No. 122,621, 1975). The previous work shows these sulfur substituted materials to be less effective than their oxygen substituted counterparts. My results, however, clearly show these sulfur derivatives to be more effective than even PPDA.

While I have shown and described particular embodiments of the present invention, modifications and variations thereof will occur to those skilled in the art. I wish it to be understood, therefore, that the appended claims are intended to cover such modifications and variations which are within the true scope and spirit of the present invention.

What I claim as new and desire to secure by Letters Patent of the United States is:

1. A method for controlling enzymatic decomposition of urea juxtaposed soil systems, said enzymatic decomposition of said urea being to ammonia and carbonic acid and being due to the action of the enzyme urease thereupon, said method consisting essentially of exposing said enzyme to relatively small, predetermined amounts of a compound of the formula

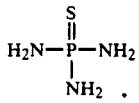

2. The method of claim 1 wherein said compound having the formula shown therein is applied with said urea in juxtaposition with said soil system at the rate ranging from about 0.01% to about 10% of urea wt/wt basis.

3. A method for controlling enzymatic decomposition of urea juxtaposed soil systems, said enzymatic decomposition of said urea being to ammonia and carbonic acid and being due to the action of the enzyme urease thereupon, said method consisting essentially of exposing said enzyme to relatively small predetermined amounts of a polymeric compound of the formula

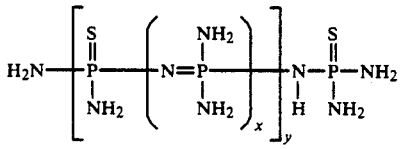

4. The method of claim 3 wherein said compound having the formula shown therein is applied with said urea in juxtaposition with said soil system at the rate ranging from about 0.01% to about 10% of urea wt/wt basis.

5. The method of claim 3 wherein said compound is prepared by the controlled thermal decomposition of $PS(NH_2)_3$.

* * * * *